United States Patent
Umeyama et al.

(10) Patent No.: US 10,461,310 B2
(45) Date of Patent: Oct. 29, 2019

(54) MANUFACTURING METHOD FOR NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Yusuke Fukumoto, Toyonaka (JP); Naoyuki Wada, Hirakata (JP); Yuji Yokoyama, Moriguchi (JP); Tatsuya Hashimoto, Osaka (JP); Naoto Onodera, Hirakata (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 242 days.

(21) Appl. No.: 15/019,499

(22) Filed: Feb. 9, 2016

(65) Prior Publication Data
US 2016/0240839 A1 Aug. 18, 2016

(30) Foreign Application Priority Data
Feb. 16, 2015 (JP) .................. 2015-027358

(51) Int. Cl.
*B29C 43/24* (2006.01)
*B32B 5/16* (2006.01)
(Continued)

(52) U.S. Cl.
CPC ........... *H01M 4/0435* (2013.01); *B29C 43/24* (2013.01); *B32B 5/16* (2013.01); *H01M 4/139* (2013.01);
(Continued)

(58) Field of Classification Search
CPC ....... B29C 43/24; B29C 43/265; B29C 43/28; B29C 43/305; B29C 43/46; B32B 5/16; B32B 15/16; B32B 15/20; B32B 37/24; B32B 2264/102; B32B 2307/306; B32B 2457/10; H01M 2/145; H01M 2/1646;
(Continued)

(56) References Cited

U.S. PATENT DOCUMENTS

2011/0052954 A1* 3/2011 Fujiwara ............. H01M 4/0404
429/94
2011/0159172 A1 6/2011 Yamamoto
(Continued)

FOREIGN PATENT DOCUMENTS

| CN | 102110809 A | 6/2011 |
|---|---|---|
| CN | 103907226 A | 7/2014 |

(Continued)

*Primary Examiner* — Michael A Tolin
(74) *Attorney, Agent, or Firm* — Sughrue Mion, PLLC

(57) ABSTRACT

A manufacturing method for a non-aqueous electrolyte secondary battery includes: forming a powder; forming a sheet-like green compact; and forming a heat-resistant layer. The powder contains composite particles and a solvent. The composite particles contain inorganic filler particles and a binder. The green compact is formed by pressing the powder in a state in which the solvent remains. The heat-resistant layer is formed by disposing the green compact on a surface of at least any of a positive electrode mixture layer and a negative electrode mixture layer after the green compact is formed.

3 Claims, 6 Drawing Sheets

(51) Int. Cl.
 *B32B 37/24* (2006.01)
 *H01M 4/139* (2010.01)
 *H01M 4/04* (2006.01)
 *H01M 4/36* (2006.01)
 *H01M 4/13* (2010.01)

(52) U.S. Cl.
 CPC ............. *H01M 4/366* (2013.01); *B32B 37/24* (2013.01); *B32B 2264/102* (2013.01); *B32B 2307/306* (2013.01); *B32B 2457/10* (2013.01); *H01M 4/13* (2013.01)

(58) Field of Classification Search
 CPC .. H01M 2/1653; H01M 2/166; H01M 2/1686; H01M 4/0404; H01M 4/0435; H01M 4/0471; H01M 4/13; H01M 4/139; H01M 4/366
 See application file for complete search history.

(56) References Cited

U.S. PATENT DOCUMENTS

| | | | |
|---|---|---|---|
| 2013/0216893 A1* | 8/2013 | Ueki | ................... H01M 2/1686 429/145 |
| 2014/0342225 A1 | 11/2014 | Isshiki et al. | |
| 2016/0172678 A1* | 6/2016 | Oyama | ................... H01G 11/38 429/217 |
| 2017/0054122 A1* | 2/2017 | Egawa | ...................... C01F 7/02 |

FOREIGN PATENT DOCUMENTS

| | | | | |
|---|---|---|---|---|
| JP | 201377560 A | 4/2013 | | |
| JP | 2013-101867 A | 5/2013 | | |
| JP | 2014-191880 A | 10/2014 | | |
| KR | 1020110074701 A | 7/2011 | | |
| WO | WO-2015016283 A1 * | 2/2015 | ............. H01G 11/38 |

* cited by examiner

MANUFACTURING METHOD FOR NON-AQUEOUS ELECTROLYTE SECONDARY BATTERY

INCORPORATION BY REFERENCE

The disclosure of Japanese Patent Application No. 2015-027358 filed on Feb. 16, 2015 including the specification, drawings and abstract is incorporated herein by reference in its entirety.

BACKGROUND OF THE INVENTION

1. Field of the Invention

The invention relates to a manufacturing method for a non-aqueous electrolyte secondary battery.

2. Description of Related Art

Japanese Patent Application Publication No. 2013-101867 (JP 2013-101867 A) discloses a method for forming a heat-resistant layer containing an insulating filler and a binder on the surface of an electrode mixture layer.

SUMMARY OF THE INVENTION

A non-aqueous electrolyte secondary battery provided with a heat-resistant layer on the surface of an electrode mixture layer, that is, a positive electrode mixture layer or a negative electrode mixture layer is known. In general, the heat-resistant layer is formed by producing a slurry in which an insulating filler and a binder are dispersed in a predetermined solvent, applying the slurry to the surface of the electrode mixture layer, and drying the resultant. At this time, the solvent infiltrates into the electrode mixture layer along with the solvent. The binder infiltrated into the electrode mixture layer covers an active material and interrupts the movement of lithium (Li) ions. This causes an increase in battery resistance.

Contrary to this, in JP 2013-101867 A, composite particles containing the insulating filler and the binder are granulated by drying the slurry using a spray drying method or the like. Furthermore, in JP 2013-101867 A, a particle layer is formed by depositing the composite particles on the surface of the electrode mixture layer, and press working is performed on the particle layer, thereby forming the heat-resistant layer. The composite particles in JP 2013-101867 A are in a dry state and do not contain a solvent. Therefore, in this method, the infiltration of the binder into the electrode mixture layer can be suppressed. However, there is room for improvement from the following viewpoints.

In JP 2013-101867 A, producing a slurry is included in the manufacturing process of the composite particles. In order to suppress the sedimentation of the insulating filler in the slurry and maintain a dispersed state, the binder having a thickening action needs to be mixed in a predetermined proportion or higher. Furthermore, in order to allow the particles of the insulating filler to adhere to each other in the slurry, an increase in the amount of the binder cannot be avoided. As a result, the amount of the binder in the heat-resistant layer is increased, and thus the diffusion resistance of Li ions in the heat-resistant layer is increased.

The invention provides a non-aqueous electrolyte secondary battery provided with a heat-resistant layer having a reduced amount of a binder.

According to an aspect of the invention, a manufacturing method for a non-aqueous electrolyte secondary battery includes: forming a powder; forming a sheet-like green compact; and forming a heat-resistant layer. The powder contains composite particles and a solvent. The composite particles contain inorganic filler particles and a binder. The green compact is formed by pressing the powder in a state in which the solvent remains. The heat-resistant layer is formed by disposing the green compact on a surface of at least any of a positive electrode mixture layer and a negative electrode mixture layer after the green compact is formed.

In the aspect, the powder of the composite particles is formed according to a wet granulation method without forming a slurry. The powder contains the solvent. That is, the powder is in a wet state. However, the powder is only a powder and is different from a state in which inorganic filler particles are dispersed in a solvent, like a slurry. The powder in the wet state does not need a binder for maintaining a state in which the inorganic filler particles are dispersed, and thus the amount of the binder for allowing the inorganic filler particles to adhere to each other can be reduced.

Next, the sheet-like green compact is formed by pressing the powder in the state in which the solvent remains. That is, by pressing the powder in the wet state, that is, by consolidating an aggregate of the composite particles, the composite particles or the inorganic filler particles can be allowed to adhere to each other, and thus the sheet-like green compact can be formed. In this aspect, even in a state in which the amount of the binder is low, the composite particles or the inorganic filler particles can be allowed to adhere to each other, and the green compact having sufficient strength can be formed. The green compact may be disposed on the surface of the electrode mixture layer to function as the heat-resistant layer.

In this aspect, the amount of the binder may be 0.20 parts by mass or more and 3.13 parts by mass or less with respect to 100 parts by mass of the inorganic filler particles. By mixing the binder in a proportion of 0.20 parts by mass or higher, the peel strength of the heat-resistant layer is enhanced. By mixing the binder in a proportion of 3.13 parts by mass or lower, the diffusion resistance of Li ions can be reduced.

In this aspect, a solid content concentration of the powder may be equal to or higher than 70 mass % and lower than 100 mass %. Here, the solid content concentration represents the ratio of the mass of components other than the solvent in the mixture. By allowing the solid content concentration to be equal to or higher than 70 mass % and lower than 100 mass %, the segregation of the binder (also referred to as "binder migration") in the heat-resistant layer can be suppressed. The segregation of the binder may become a cause of the increase in resistance.

Accordingly, the non-aqueous electrolyte secondary battery provided with the heat-resistant layer having a reduced amount of a binder can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention (hereinafter, referred to as "this embodiment") will be described in detail, and this embodiment is not limited thereto.

[Manufacturing Method for Non-Aqueous Electrolyte Secondary Battery]

Figure 1:
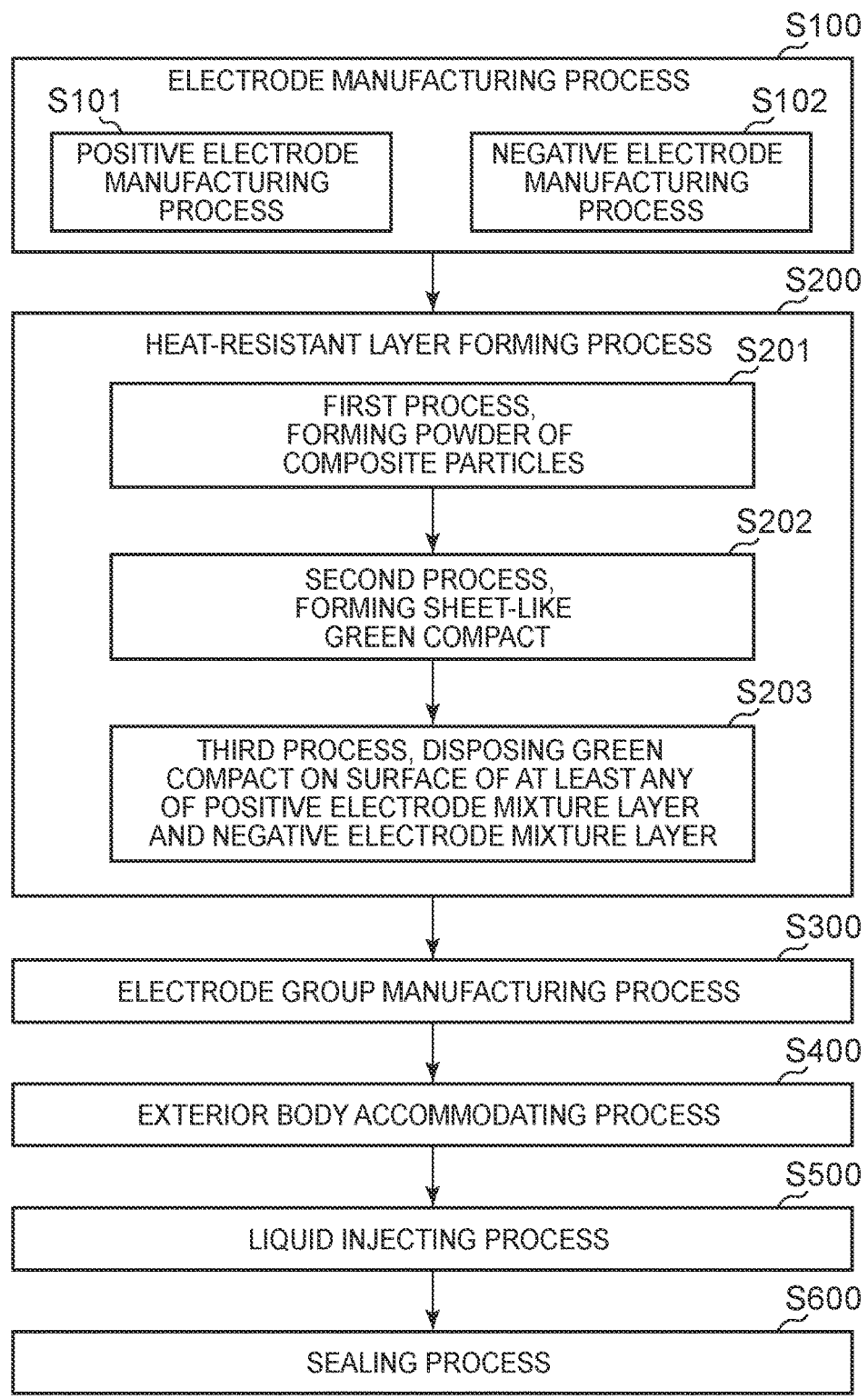
FIG. 1 is a flowchart schematically illustrating a manufacturing method for a non-aqueous electrolyte secondary battery according to an embodiment of the invention.

FIG. 1 is a flowchart schematically illustrating a manufacturing method for a non-aqueous electrolyte secondary battery according to an embodiment of the invention. As illustrated in FIG. 1, the manufacturing method includes an electrode manufacturing process (S100), a heat-resistant layer forming process (S200), an electrode group manufacturing process (S300), an exterior body accommodating process (S400), a liquid injecting process (S500), and a sealing process (S600). Hereinafter, each process will be described.

[Electrode Manufacturing Process (S100)]

As illustrated in FIG. 1, the electrode manufacturing process includes a positive electrode manufacturing process (S101), and a negative electrode manufacturing process (S102).

[Positive Electrode Manufacturing Process (S101)]

Figure 2:
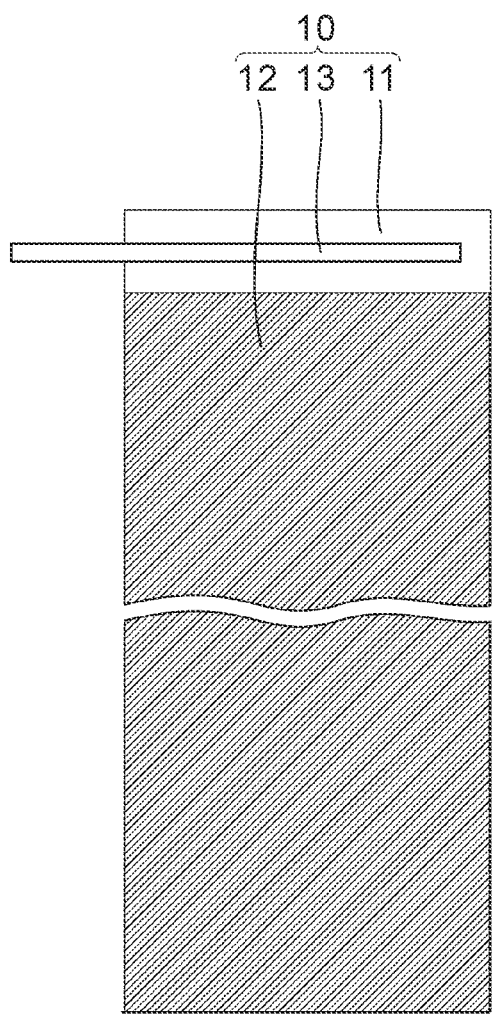
FIG. 2 is a schematic plan view illustrating an example of the configuration of a positive electrode according to the embodiment of the invention.

In the positive electrode manufacturing process, for example, a positive electrode 10 illustrated in FIG. 2 is manufactured. FIG. 2 is a schematic plan view illustrating an example of the configuration of a positive electrode according to this embodiment. The positive electrode 10 is a sheet member having a long band shape. The positive electrode 10 includes a positive electrode current collector foil 11, and a positive electrode mixture layer 12 formed on the surface of the positive electrode current collector foil 11. The positive electrode current collector foil 11 is, for example, an aluminum (Al) foil. A positive electrode lead tab 13 is bonded to the positive electrode current collector foil 11.

The positive electrode 10 is manufactured, for example, as follows. A positive electrode mixture slurry containing a positive electrode active material is produced. The positive electrode mixture slurry is applied to the surface of the positive electrode current collector foil 11. The positive electrode mixture layer 12 is formed by drying the slurry-coated film. The positive electrode mixture layer 12 is compressed to adjust the thickness thereof. The positive electrode current collector foil 11 and the positive electrode mixture layer 12 are machined to predetermined dimensions. The positive electrode lead tab 13 is bonded to the positive electrode current collector foil 11. The positive electrode mixture layer 12 may also be formed on both the front and rear surfaces of the positive electrode current collector foil 11.

The positive electrode mixture slurry may be produced by kneading the positive electrode active material, a conductive material, and a binder in a solvent. Examples of the positive electrode active material include $LiCoO_2$, $LiNiO_2$, a compound expressed as the general formula $LiNi_aCo_bO_2$ (in the formula, a+b=1, 0<a<1, and 0<b<1), $LiMnO_2$, $LiMn_2O_4$, a compound expressed as the general formula $LiNi_aCo_bMn_cO_2$ (in the formula, a+b+c=1, 0<a<1, 0<b<1, and 0<c<1), and $LiFePO_4$. Examples of the compound expressed as the general formula $LiNi_aCo_bMn_cO_2$ include $LiNi_{1/3}Co_{1/3}Mn_{1/3}O_2$.

The conductive material may be, for example, acetylene black (AB) or graphite. The amount of the mixed conductive material may be, for example, 1 part by mass to 10 parts by mass with respect to 100 parts by mass of the positive electrode active material. The binder may be, for example, polyvinylidene fluoride (PVDF), or polytetrafluoroethylene (PTFE). The amount of the mixed binder may be, for example, 1 part by mass to 10 parts by mass with respect to 100 parts by mass of the positive electrode active material. The solvent may be, for example, N-methyl-2-pyrrolidone (NMP).

[Negative Electrode Manufacturing Process (S102)]

Figure 3:
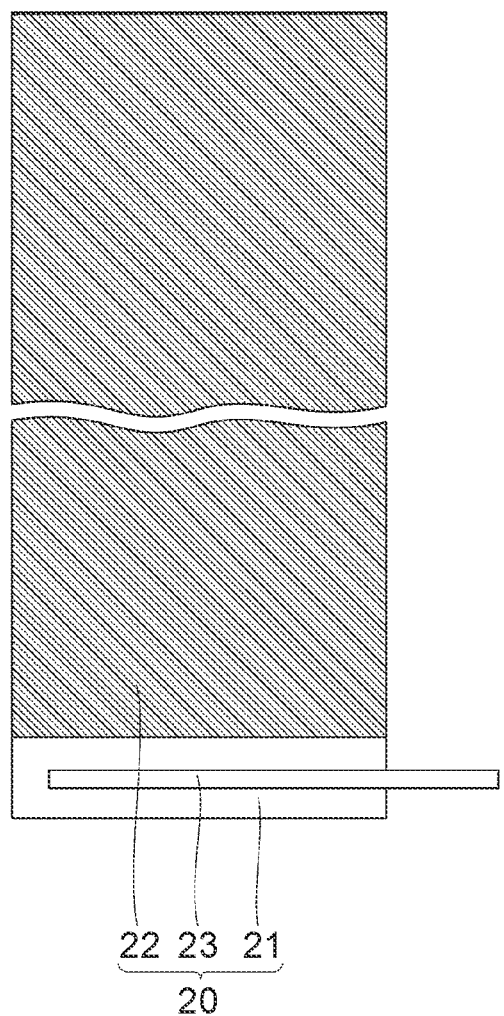
FIG. 3 is a schematic plan view illustrating an example of the configuration of a negative electrode according to the embodiment of the invention.

In the negative electrode manufacturing process, for example, a negative electrode 20 illustrated in FIG. 3 is manufactured. FIG. 3 is a schematic plan view illustrating an example of the configuration of a negative electrode according to this embodiment. The negative electrode 20 is a sheet member having a long band shape. The negative electrode 20 includes a negative electrode current collector foil 21, and a negative electrode mixture layer 22 formed on the surface of the negative electrode current collector foil 21. The negative electrode current collector foil 21 is, for example, a copper (Cu) foil. A negative electrode lead tab 23 is bonded to the negative electrode current collector foil 21.

The negative electrode 20 is manufactured, for example, as follows. A negative electrode mixture slurry containing a negative electrode active material is produced. The negative electrode mixture slurry is applied to the surface of the negative electrode current collector foil 21. The negative electrode mixture layer 22 is formed by drying the slurry-coated film. The negative electrode mixture layer 22 is compressed to adjust the thickness thereof. The negative electrode current collector foil 21 and the negative electrode mixture layer 22 are machined to predetermined dimensions. The negative electrode lead tab 23 is bonded to the negative electrode current collector foil 21. The negative electrode mixture layer 22 may also be formed on both the front and rear surfaces of the negative electrode current collector foil 21.

The negative electrode mixture slurry may be produced by kneading the negative electrode active material, a thickening material, and a binder in a solvent. Examples of the negative electrode active material may include a carbon-based negative electrode active material such as graphite or coke or may include an alloy-based negative electrode active material such as silicon (Si) or tin (Sn). The thickening material may be, for example, carboxymethylcellulose sodium salt (CMC-Na). The binder may be, for example, styrene-butadiene rubber (SBR). The amount of the mixed thickening material or the mixed binder may be, for example, 0.5 parts by mass to 3 parts by mass with respect to 100 parts by mass of the negative electrode active material. The solvent may be, for example, water.

[Heat-Resistant Layer Forming Process (S200)]

As illustrated in FIG. 1, the heat-resistant layer forming process includes a first process (S201), a second process (S202), and a third process (S203). The processes are sequentially performed. That is, the manufacturing method for the non-aqueous electrolyte secondary battery includes the first process, the second process, and the third process.

[First Process (S201)]

In the first process, a powder which contains composite particles containing inorganic filler particles and a binder, and a solvent is formed. The powder of the composite particles is also called "granules". Specifically, the inorganic filler particles, the binder, and the solvent may be mixed in predetermined proportions, for example, by using a mixing apparatus. Accordingly, the powder of the composite particles in which two or more inorganic filler particles and the binder are compounded can be formed. As the mixing apparatus, a general powder mixing apparatus may be used. In this embodiment, a mixing apparatus provided with, in addition to a stirring blade for stirring the entire mixing tank, a crushing blade for crushing particles (beads) which are excessively compounded is appropriate. Examples of the mixing apparatus may include High Flex Gral (trade name) and High Speed Mixer (trade name) manufactured by EARTHTECHNICA Co., Ltd. By appropriately crushing and granulating the particles, the powder having a sharp particle size distribution can be produced. As the powder of the composite particles approaches monodispersity, the enhancement of the uniformity of the heat-resistant layer can be expected.

The inorganic filler particles are preferably formed of an inorganic compound having a melting point of 1000° C. or higher. Examples of the inorganic filler particles include α alumina ($\alpha$-$Al_2O_3$), boehmite ($Al_2O_3.H_2O$), titania ($TiO_2$), zirconia ($ZrO_2$), and magnesia ($MgO$). The inorganic filler particles may exhibit, for example, the following powder properties: α alumina (a D50 of 0.2 μm to 1.2 μm, and a BET of 1.3 $m^2$/g to 50 $m^2$/g), boehmite (a D50 of 0.2 μm to 1.8 μm, and a BET of 2.8 $m^2$/g to 50 $m^2$/g), titania (a D50 of 0.2 μm to 1.0 μm, and a BET of 2.0 $m^2$/g to 50 $m^2$/g), zirconia (a D50 of 0.2 μm to 1.0 μm, and a BET of 2.0 $m^2$/g to 50 $m^2$/g), and magnesia (a D50 of 0.2 μm to 1.0 μm, and a BET of 2.0 $m^2$/g to 50 $m^2$/g).

Here, "D50" of this specification represents a particle size at a cumulative value of 50% in a volume-based particle size distribution measured according to a laser diffraction/scattering method. In addition, "BET" represents a specific surface area measured according to a BET method.

The binder is not particularly limited. Examples of the binder that can be used include PVDF, PTFE, polyacrylonitrile (PAN), polyacrylic acid (PAA), CMC, and SBR. According to this embodiment, the amount of the binder can be reduced compared to the related art. Due to a reduction in the amount of the binder, a reduction in battery resistance, the enhancement of cycle life, and the like can be expected. The amount of the mixed binder in this embodiment may be, for example, 0.20 parts by mass or more and 3.13 parts by mass or less with respect to 100 parts by mass of the inorganic filler particles. The lower limit of the amount of the mixed binder may be 0.25 parts by mass. The upper limit of the amount of the mixed binder may be 3.03 parts by mass, 1.51 parts by mass, or 0.75 parts by mass. In this embodiment, with such a small amount of the binder, the peel strength of the heat-resistant layer can be ensured.

The solvent is appropriately selected depending on the type of the binder or the like. Examples of the solvent that can be used include NMP, dimethylformamide (DMF), dimethylacetamide (DMA), and water. The amount of the solvent may be adjusted so that the solid content concentration thereof is equal to or more than 70 mass % and less than 100 mass %. By setting a high solid content concentration and reducing the amount of the solvent, segregation of the binder can be suppressed. By suppressing the segregation of the binder, a further reduction in the battery resistance is expected. The lower limit of the solid content concentration may be 75 mass % or 79 mass %. The upper limit of the solid content concentration may be 90 mass %, 85 mass %, or 82 mass %. As described above, by ensuring a certain amount of the solvent, the fluidity of the composite particles or the inorganic filler particles is enhanced during compaction. Accordingly, the enhancement of the filling properties of the heat-resistant layer is expected.

The particle size of the composite particles can be adjusted by the solid content concentration, stirring conditions, and the like. Otherwise, the particle size distribution thereof may be adjusted by performing classification. In this embodiment, the D50 of the powder of the composite particles may be, for example, about 10 μm to 200 μm.

[Second Process (S202)]

Figure 4:
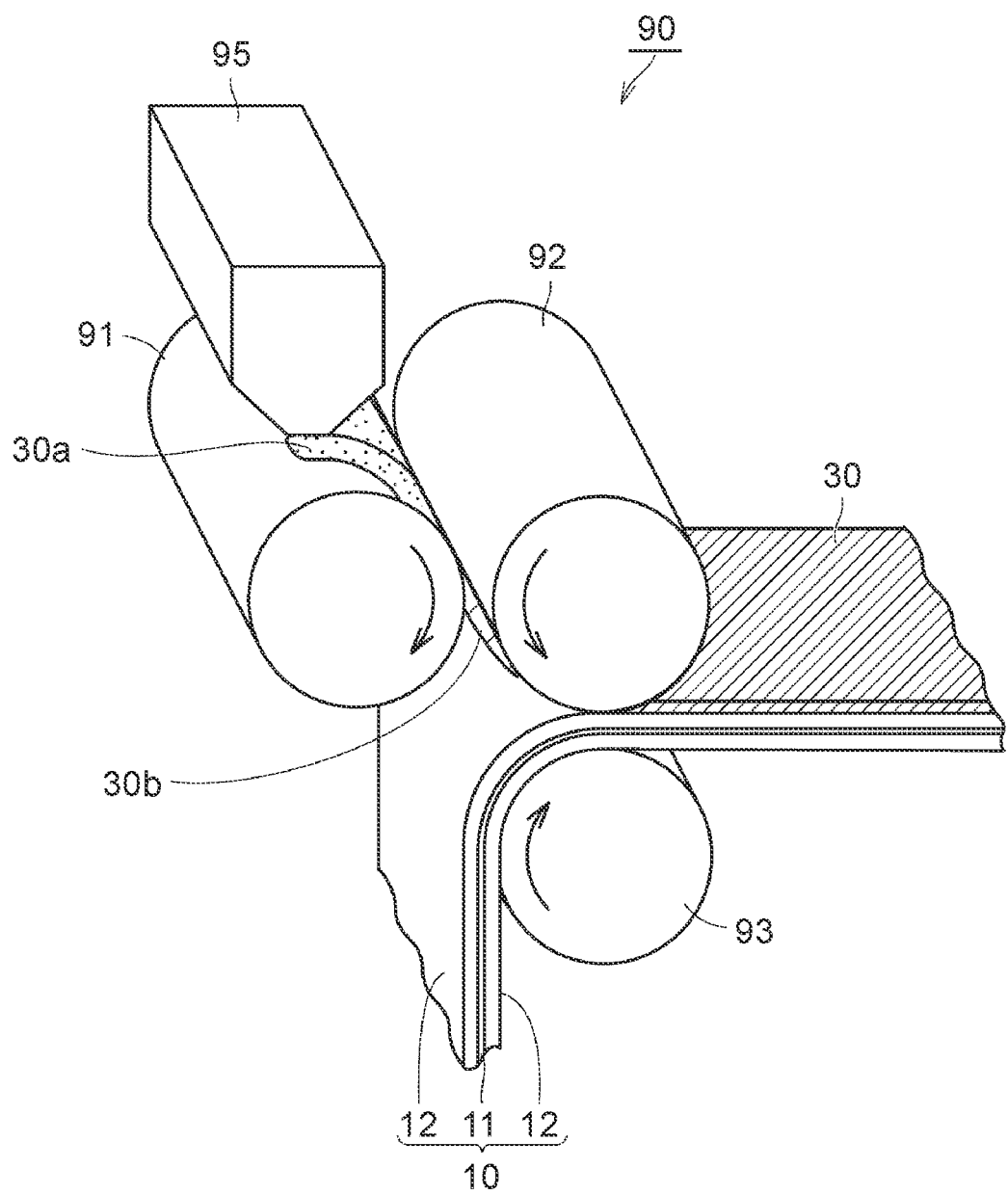
FIG. 4 is a schematic view illustrating a second process and a third process according to the embodiment of the invention.

In the second process, a sheet-like green compact is formed by pressing the powder in a state in which the solvent remains. FIG. 4 is a schematic view illustrating an example of the second process, and the third process, which will be described later. By using a molding and transferring apparatus 90 illustrated in FIG. 4, the processes can be performed. Hereinafter, the second process and the third process will be described according to operations of the molding and transferring apparatus 90.

The powder of the composite particles obtained in the first process is supplied to a feeder 95 of the molding and transferring apparatus 90. A powder 30a of the composite particles is supplied between an A roll 91 and a B roll 92 from the feeder 95. Arrows in FIG. 4 represent the rotational directions of the corresponding roll members. The powder 30a of the composite particles is transported along the rotational direction of the A roll 91 or the B roll 92, and reaches the gap between the A roll 91 or the B roll 92. In the gap, pressure is applied to the powder 30a from the A roll 91 and the B roll 92. Accordingly, the powder 30a is formed to a sheet-like green compact 30b. At this time, since the solvent remains in the powder 30a, the composite particles or the inorganic filler particles may slightly flow. Accordingly, there is a tendency toward an increase in the filling properties of the green compact 30b. The amount (mass per unit area) and the thickness of the applied green compact 30b are adjusted by the gap between the A roll 91 and the B roll 92. The amount and the thickness of the applied green compact 30b can be appropriately changed depending on the battery specification. The amount of the applied green compact 30b may be, for example, about 1 mg/$cm^2$ to 20 mg/$cm^2$. The thickness of the green compact 30b may be, for example, about 1 μm to 20 μm. Here, although an example in which compaction is performed between the two rolls is illustrated, the forming method is not limited thereto as long as the powder can be formed to a sheet shape. For example, the sheet-like green compact may be formed by a flat-plate press.

[Third Process (S203)]

The third process is performed after the second process. In the third process, the heat-resistant layer is formed by disposing the green compact on the surface of at least any of the positive electrode mixture layer and the negative electrode mixture layer. As illustrated in FIG. 4, the green compact 30b obtained in the second process is transported along the rotational direction of the B roll 92. The positive electrode 10 is transported along the rotational direction of a C roll 93. In the gap between the B roll 92 and the C roll 93, pressure is applied to the green compact 30b and the positive electrode 10 from the B roll 92 and the C roll 93.

Accordingly, the green compact 30b is transferred to the surface of the positive electrode mixture layer 12 and is compressed. The green compact 30b is disposed on the surface of the positive electrode mixture layer 12 as described above such that a heat-resistant layer 30 is formed. Thereafter, the solvent that remains in the heat-resistant layer 30 may be vaporized by using a drying furnace. However, in this embodiment, since the solid content concentration of the powder is high and the amount of the solvent is low, there may be cases where such a drying operation is unnecessary.

[Disposition of Heat-Resistant Layer]

In FIG. 4, an example in which the heat-resistant layer is formed on the surface of the positive electrode mixture layer is illustrated. However, the heat-resistant layer may also be disposed on the surface of the negative electrode mixture layer, or may also be disposed on both of the surface of the positive electrode mixture layer and the surface of the negative electrode mixture layer. The heat-resistant layer is interposed between the electrode mixture layer and a separator in the battery. The primary component of the heat-resistant layer is the inorganic filler particles. Here, the primary component represents a component that occupies 90 mass % or more in the entire composition. Therefore, the heat-resistant layer exhibits heat-resistant properties derived from the inorganic filler particles. In the related art, the heat-resistant layer is provided to suppress melting of the separator when a small short circuit is generated between the positive electrode and the negative electrode. In the research by the inventors, a possibility that high-rate (high-current) cycle performance will be improved by the disposition of the heat-resistant layer is newly found.

Figure 5:
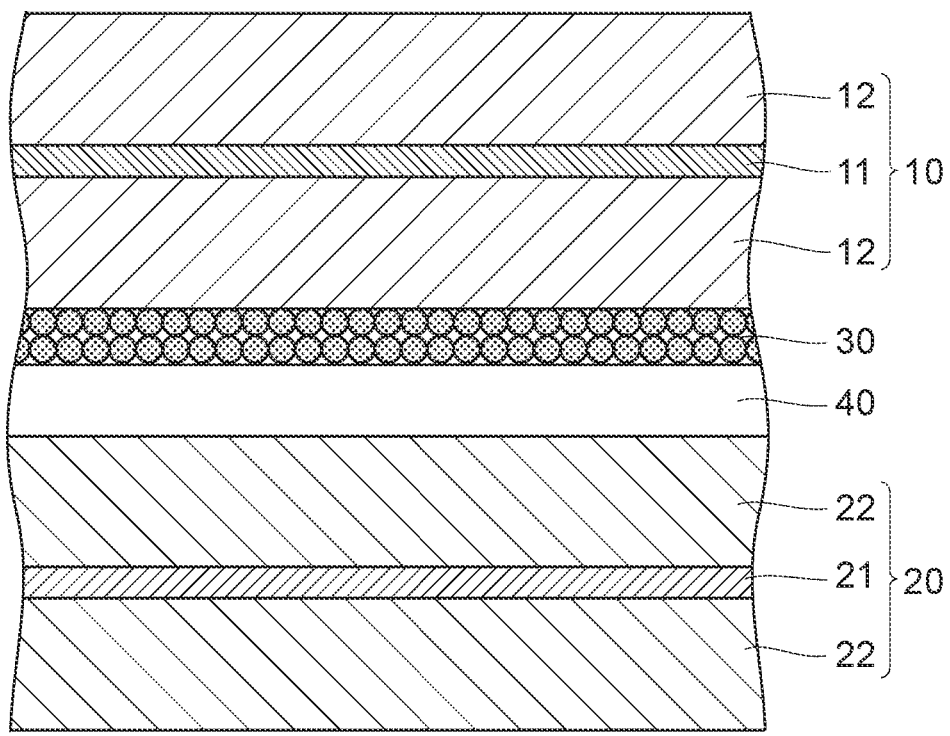
FIG. 5 is a schematic sectional view illustrating an example of the disposition of a heat-resistant layer in an electrode group.

FIG. 5 is a schematic sectional view illustrating an example of the disposition of the heat-resistant layer in an electrode group. As illustrated in FIG. 5, the positive electrode 10 and the negative electrode 20 are laminated with a separator 40 interposed therebetween. The positive electrode 10 includes the positive electrode current collector foil 11, and the positive electrode mixture layer 12 formed on the surface of the positive electrode current collector foil 11. The negative electrode 20 includes the negative electrode current collector foil 21, and the negative electrode mixture layer 22 formed on the surface of the negative electrode current collector foil 21. In FIG. 5, the heat-resistant layer 30 is disposed on the surface of the positive electrode mixture layer 12. That is, the heat-resistant layer 30 is interposed between the positive electrode mixture layer 12 and the separator 40. All of the positive electrode mixture layer 12, the negative electrode mixture layer 22, the heat-resistant layer 30, and the separator 40 are porous layers having pores therein and hold an electrolytic liquid. However, the pore diameters and the pore volumes of the layers vary. Therefore, the amounts of the electrolytic liquid held in the layers vary. Furthermore, the fluidity of the electrolytic liquid in the layers also varies.

Here, for example, a case in which the pore diameters of the positive electrode mixture layer, the negative electrode mixture layer, and the heat-resistant layer are increased in this order is considered. As the pore diameter is increased, there is a tendency toward an increase in the fluidity of the electrolytic liquid in the layers. Therefore, when the heat-resistant layer is disposed on the surface of the negative electrode mixture layer under these conditions, the electrolytic liquid easily moves from the negative electrode mixture layer toward the heat-resistant layer adjacent to the negative electrode mixture layer. As the electrolytic liquid moves, the distribution of the electrolytic liquid becomes non-uniform.

When the distribution of the electrolytic liquid becomes non-uniform, the battery reaction becomes irregular, and performance degradation is accelerated. Particularly, during high-rate cycles in which expansion and contraction of the positive electrode mixture layer and the negative electrode mixture layer frequently occur, the effect becomes significant. This is because the electrolytic liquid is extruded from the mixture layers due to the expansion and contraction of the mixture layers.

In this case, for example, as illustrated in FIG. 5, the heat-resistant layer 30 may be disposed on the surface of the positive electrode mixture layer 12. As described above, by disposing the heat-resistant layer 30 at a position distant from the negative electrode mixture layer 22, the movement of the electrolytic liquid from the negative electrode mixture layer 22 can be suppressed. That is, the distribution of the electrolytic liquid can be controlled by the disposition of the heat-resistant layer. Accordingly, the improvement of the high-rate cycle performance can be expected. Examples of an index of the pore diameter of the electrode mixture layer include a mixture density. Therefore, it can be said that it is preferable to form the heat-resistant layer on the surface of the mixture layer having a high mixture density (that is, having a smaller pore diameter) among the positive electrode mixture layer and the negative electrode mixture layer. The disposition of the heat-resistant layer may be appropriately changed depending on the battery performance and design.

[Electrode Group Manufacturing Process (S300)]

Figure 6:
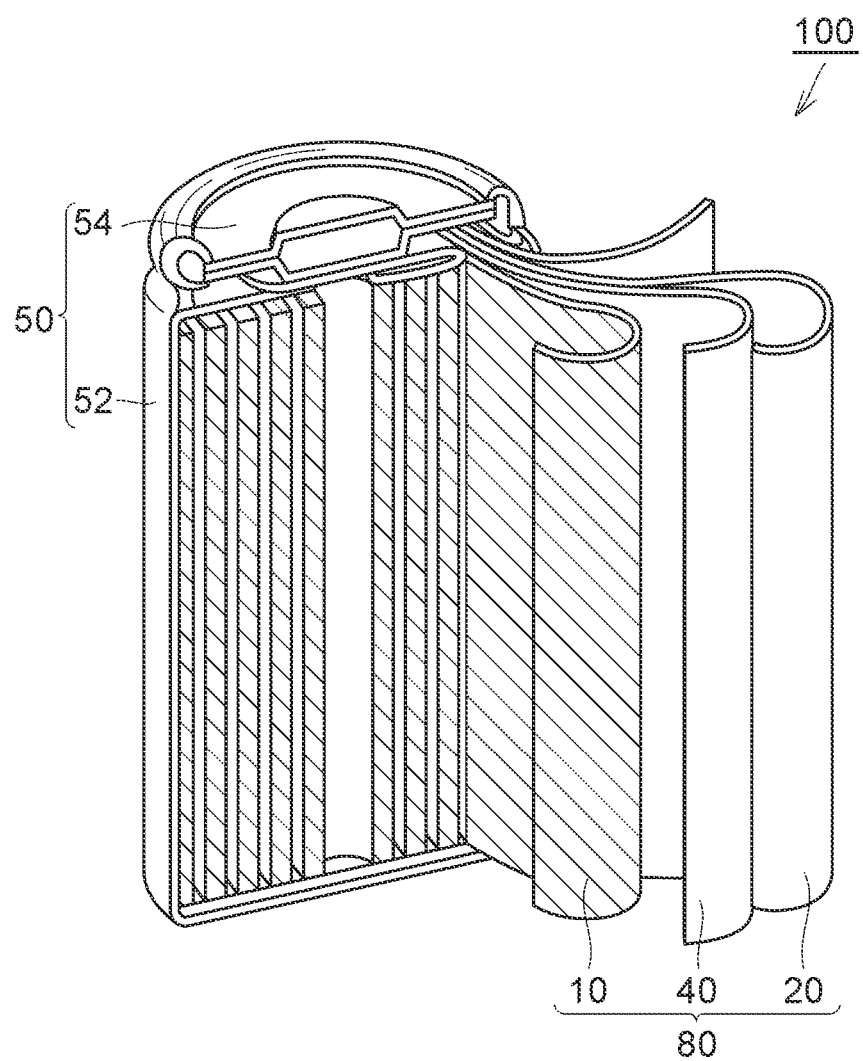
FIG. 6 is a schematic perspective sectional view illustrating an example of the configuration of a non-aqueous electrolyte secondary battery according to the embodiment of the invention.

In the electrode group manufacturing process, an electrode group 80 illustrated in FIG. 6 is manufactured. FIG. 6 is a schematic perspective sectional view illustrating an example of the configuration of a non-aqueous electrolyte secondary battery 100 according to the embodiment of the invention. The electrode group 80 illustrated in FIG. 6 is manufactured by laminating the positive electrode 10 and the negative electrode 20 with the separator 40 interposed therebetween and the winding the laminate. Although not illustrated in FIG. 6, as described above, in this embodiment, the heat-resistant layer is disposed on the surface of at least any of the positive electrode 10 and the negative electrode 20.

The separator may be a microporous film made of, for example, a polyolefin-based material, or the like. Specifically, the separator may be a microporous film made of polyethylene (PE), polypropylene (PP), or the like. The separator may also be a laminate of a plurality of microporous films. The thickness of the separator may be, for example, about 5 μm to 40 μm.

[Exterior Body Accommodating Process (S400)]

In the exterior body accommodating process, as illustrated in FIG. 6, the electrode group 80 is accommodated in an exterior body 50. In FIG. 6, the exterior body 50 having a cylindrical shape is illustrated. The exterior body 50 is made of, for example, stainless steel. The exterior body 50 is constituted by a cylindrical case 52, and a cap 54. The cylindrical case 52 includes a bottom portion, and a cylindrical side wall that is connected to the bottom portion. On the opposite side of the bottom portion of the cylindrical case 52, an opening is formed. In the exterior body accommodating process, the electrode group 80 is accommodated in the cylindrical case 52. At this time, for example, the negative electrode lead tab (not illustrated in FIG. 6) is welded to the bottom portion of the cylindrical case 52.

[Liquid Injecting Process (S500)]

In the liquid injecting process, the electrolytic liquid is injected from the opening of the cylindrical case 52. The electrolytic liquid is an electrolyte solution in which a supporting electrolyte is dissolved in a non-aqueous solvent. Examples of the non-aqueous solvent include cyclic carbonates such as ethylene carbonate (EC), propylene carbonate (PC), butylene carbonate (BC), and γ-butyrolactone (γBL), and chain carbonates such as dimethyl carbonate (DMC), ethyl methyl carbonate (EMC), and diethyl carbonate (DEC). The non-aqueous solvents may be singly used, or two or more types thereof may be used in combination. In a case where the cyclic carbonates and the chain carbonates are mixed to be used, the volume ratio of the cyclic carbonate and the chain carbonate may be, for example, about 1:9 to 5:5.

As the supporting electrolyte, for example, Li salts such as $LiPF_6$, $LiBF_4$, $LiClO_4$, $LiAsF_6$, $Li(CF_3SO_2)_2N$, and $LiCF_3SO_3$. The supporting electrolytes may be singly used, or two or more types thereof may be used in combination. The concentration of the supporting electrolyte may be, for example, about 0.5 mol/L to 2.0 mol/L.

[Sealing Process (S600)]

In the sealing process, the opening of the cylindrical case 52 is sealed by the cap 54. The cap 54 is welded to, for example, the positive electrode lead tab (not illustrated in FIG. 6). Thereafter, the exterior body 50 is sealed by crimping. Accordingly, a non-aqueous electrolyte secondary battery 100 is completed.

Hereinabove, this embodiment is exemplified by a cylindrical battery. However, this embodiment can also be applied to a square battery or a laminated battery. The electrode group is not limited to a wound type. The electrode group may also be a laminated electrode group in which the positive electrode and the negative electrode are alternately laminated with the separator interposed therebetween. In addition, depending on the battery configuration, instead of the electrolytic liquid, a gel-like electrolyte, or a solid electrolyte may also be used.

Hereinafter, this embodiment will be described using Examples, but this embodiment is not limited thereto. Here, manufacturing conditions Nos. 1 to 8 are referred to as Examples, and a manufacturing condition No. 9 is referred to as Comparative Example.

[Manufacturing Condition No. 1]

A non-aqueous electrolyte secondary battery was manufactured as follows.

[Electrode Manufacturing Process (S100)]

1. Positive Electrode Manufacturing Process (S101)

The following materials were prepared.

Positive electrode active material: $LiNi_{1/3}Co_{1/3}Mn_{1/3}O_2$ (D50: 6.0 μm)

Conductive material: AB

Binder: PVDF

Solvent: NMP

Positive electrode current collector foil: Al foil

A conductive material slurry was manufactured by dispersing AB and PVDF in the solvent using a beads mill. The conductive material slurry was applied to the surface of the positive electrode current collector foil using a gravure coater and was dried. Accordingly, a conductive layer was formed on the surface of the positive electrode current collector foil. The mass of the applied conductive layer was 0.1 mg/cm².

A positive electrode mixture slurry was manufactured by kneading the positive electrode active material (93 parts by mass), the conductive material (4 parts by mass), and the binder (3 parts by mass) with the solvent using a planetary mixer. The positive electrode mixture slurry was applied from above the conductive layer using a die coater, and was dried. Accordingly, a positive electrode mixture layer was formed. The mass of the applied positive electrode mixture after the drying was 30 mg/cm². As described above, the positive electrode 10 illustrated in FIG. 2 was manufactured.

2. Negative Electrode Manufacturing Process (S102)

The following materials were prepared.

Negative electrode active material: scale-like graphite (D50: 10 μm)

Thickening material: CMC-Na

Binder: SBR

Solvent: water

Negative electrode current collector foil: Cu foil

A negative electrode mixture slurry was manufactured by kneading the negative electrode active material (98 parts by mass), the thickening material (1 part by mass), and the binder (1 part by mass) with the solvent using a planetary mixer. The negative electrode mixture slurry was applied to the surface of the negative electrode current collector foil using the die coater, and was dried. Accordingly, a negative electrode mixture layer was formed. The mass of the applied negative electrode mixture layer after the drying was 18 mg/cm². As described above, the negative electrode 20 illustrated in FIG. 3 was manufactured.

[Heat-Resistant Layer Forming Process (S200)]

1. First Process (S201)

The following materials were prepared.

Inorganic filler particles: α alumina

Binder: PVDF

Solvent: NMP

A granulating apparatus "High Flex Gral" manufactured by EARTHTECHNICA Co., Ltd. was prepared. High Flex Gral is a powder mixing apparatus provided with a stirring blade (agitator) for stirring the entire mixing tank, and a crushing blade (chopper) for crushing particles. The inorganic filler particles (99.75 parts by mass), the binder (0.25 parts by mass), and the solvent were poured into the mixing tank of the mixing apparatus and were granulated. The amount of the solvent was adjusted so that the solid content concentration thereof was 79 mass %. Accordingly, a powder which contained composite particles containing the inorganic filler particles and the binder, and the solvent was produced.

2. Second Process (S202)

The powder in a state in which the solvent was remained was formed to a sheet-like green compact as described above by using the molding and transferring apparatus 90 illustrated in FIG. 4. The amount of the applied green compact was adjusted so that the amount of the green compact applied to the heat-resistant layer after the drying was 5 mg/cm².

3. Third Process (S203)

Subsequently, the green compact was disposed on the surface of the positive electrode mixture layer as described above by using the molding and transferring apparatus 90 illustrated in FIG. 4. Accordingly, a heat-resistant layer was formed.

[Electrode Group Manufacturing Process (S300) to Sealing Process (S600)]

A microporous film separator made of PE was prepared. An electrode group was manufactured by laminating the positive electrode and the negative electrode with the separator interposed therebetween and the winding the laminate. An exterior body constituted by a cylindrical case and a cap was prepared. The electrode group was accommodated in the cylindrical case. The electrolytic liquid was injected into the cylindrical case. The exterior body was sealed. As described above, a 18650 size (a diameter of 18 mm and a height of 650 mm) non-aqueous electrolyte secondary battery was manufactured. The rated capacity of the non-aqueous electrolyte secondary battery is 1.0 Ah.

[Manufacturing Conditions Nos. 2 to 7]

As shown in Table 1, non-aqueous electrolyte secondary batteries were manufactured in the same manner as in the manufacturing condition No. 1 except that the mixing ratios of the inorganic filler particles and the binder, and the solid content concentrations were changed in the first process.

tration thereof was 40 mass %. Accordingly, a slurry to become a heat-resistant layer was produced.

The slurry was applied to the surface of the positive electrode mixture layer using the gravure coater and was dried, thereby forming the heat-resistant layer. The mass of the applied heat-resistant layer was 5 mg/cm$^2$ (after drying). Excluding this, a non-aqueous electrolyte secondary battery was manufactured in the same manner as in the manufacturing condition No. 8.

TABLE 1

| | Heat-resistant layer forming process | | | | | | Evaluation | | |
|---|---|---|---|---|---|---|---|---|---|
| | First process | | | | Second process | Third process | Heat-resistant layer | | Battery performance |
| Manufacturing condition No. | Inorganic filler particles Parts by mass | Binder Parts by mass | Amount of mixed binder with respect to 100 parts by mass of inorganic filler particles Parts by mass | Solid content concentration mass % | Heat-resistant layer forming method | Disposition of heat-resistant layer | Peel strength N/m | Migration index | High-rate pulse cycle Number of cycles |
| 1 | 99.75 | 0.25 | 0.25 | 79 | Compaction | Surface of positive electrode mixture layer | 12 | 0.9 | 290 |
| 2 | 99.50 | 0.75 | 0.75 | 80 | Compaction | Surface of positive electrode mixture layer | 15 | 0.8 | 280 |
| 3 | 99.25 | 1.50 | 1.51 | 80 | Compaction | Surface of positive electrode mixture layer | 16 | 1.0 | 260 |
| 4 | 99.00 | 3.00 | 3.03 | 81 | Compaction | Surface of positive electrode mixture layer | 17 | 0.9 | 230 |
| 5 | 99.80 | 0.20 | 0.20 | 79 | Compaction | Surface of positive electrode mixture layer | 9 | 0.8 | 260 |
| 6 | 98.95 | 3.10 | 3.13 | 81 | Compaction | Surface of positive electrode mixture layer | 17 | 1.1 | 200 |
| 7 | 96.00 | 4.00 | 4.17 | 82 | Compaction | Surface of positive electrode mixture layer | 29 | 1.0 | 100 |
| 8 | 96.00 | 4.00 | 4.17 | 82 | Compaction | Surface of negative electrode mixture layer | 30 | 1.1 | 60 |
| 9 | 96.00 | 4.00 | 4.17 | 40 | Slurry application | Surface of negative electrode mixture layer | 12 | 2.2 | 50 |

[Manufacturing Condition No. 8]

As shown in Table 1, a non-aqueous electrolyte secondary battery was manufactured in the same manner as in the manufacturing condition No. 7 except that the sheet-like green compact, that is, the heat-resistant layer was disposed on the surface of the negative electrode mixture layer.

[Manufacturing Condition No. 9]

A disperser "Kureamix" manufactured by M Technique Co., Ltd. was prepared. The inorganic filler particles (96 parts by mass), the binder (4 parts by mass), and the solvent were poured into a container, and the solid content thereof was dispersed in the solvent by the disperser. The amount of the solvent was adjusted so that the solid content concen-

[Evaluation]

The heat-resistant layer and the battery were evaluated as follows.

1. Peel Strength

A 90° peel Test was conducted on the basis of "JISZ0237: Testing methods of pressure-sensitive adhesive tapes and sheets", and the peel strength of the heat-resistant layer was measured. The results are shown in Table 1. As the peel strength increases, the heat-resistant layer is less likely to peel off from the surface of the mixture layer and is thus good.

2. Migration Index

The distribution of the binder in the heat-resistant layer was evaluated by a migration index. The measurement and calculation of the migration index were performed as follows. A sample for cross-section observation was cut from the positive electrode or the negative electrode on which the heat-resistant layer was formed, and the cross-section was cleaned by a cross-section polisher. The cross-section of the heat-resistant layer was subjected to surface analysis by using a scanning electron microscope and an energy-dispersive X-ray spectrometer (SEM-EDX), and fluorine (F) mapping was performed. At this time, the analyzed image was adjusted to include the upper end and the lower end of the heat-resistant layer in the thickness direction thereof. Fluorine comes from PVDF used as the binder for the heat-resistant layer. Therefore, the distribution of fluorine can be regarded as the distribution of the binder. The cross-section of the heat-resistant layer was bisected in the thickness direction, and the side that comes into contact with the mixture layer was referred to as a first region, while the surface side of the heat-resistant layer was referred to as a second region. The migration index was calculated by dividing a cumulative value of fluorine detection intensity in the second region by a cumulative value of fluorine detection intensity in the first region. The results are shown in Table 1. When the binder is uniformly distributed in the thickness direction of the heat-resistant layer, the migration index has a value close to 1.0. On the other hand, when the binder is segregated to the surface layer side of the heat-resistant layer, that is, the second region, the migration index has a value greater than 1.0.

3. High-Rate Pulse Cycle

According to the research by the inventors, in a charge and discharge cycle pattern in which high-rate discharge and low-rate charge are repeated, the effect of the diffusion resistance of Li ions is easily exhibited. This time, the cycle life of each battery was evaluated on the basis of the high-rate pulse cycle.

The battery manufactured under each of the conditions was put in a thermostatic bath set to 25° C. In the thermostatic bath, the state of charge (SOC) of the battery was adjusted to 60%. Next, a charge and discharge cycle in which the following discharge and charge were performed as one cycle was repeated. Here, the unit "C" of a current value represents a current value for which the rated capacity of the battery is discharged in one hour.

Discharge: current value 10C×80 seconds

Charge: current value 2C×400 seconds

The charge and discharge cycle started from discharge and ended when the battery voltage during discharge had reached 1.5 V or the battery voltage during charge reached 4.3 V. In this experiment, the battery voltage during charge did not reached 4.3 V. The number of cycles when the battery voltage had reached 1.5 V is shown in Table 1. It is shown that as the number of cycles is increased, the cycle life is increased.

CONCLUSION AND DISCUSSION

As shown in Table 1, as the amount of the binder is decreased, the number of cycles during the high-rate pulse cycle is enhanced. It is thought that this is because the diffusion resistance of Li ions in the heat-resistant layer is decreased as the amount of the binder is decreased.

When the manufacturing conditions Nos. 7 to 9 are compared to each other, even at the same amount of the binder, in the manufacturing conditions Nos. 7 and 8 associated with Examples, a peel strength nearly three times as high as that of the manufacturing condition No. 9 associated with Comparative Example is obtained. The following (i) to (iii) are thought of as the reasons.

(i) In Examples, the composite particles or the inorganic filler particles are adhered to each other in a state in which the amount of the solvent is low in the second process, and thus a strong green compact can be formed.

(ii) In Examples, the green compact (the heat-resistant layer) and the mixture layer are compressed in the state in which the amount of the solvent is low in the third process, and thus the infiltration of the binder or the like is suppressed and the amount of the binder at the interface between the heat-resistant layer and the mixture layer can be ensured.

(iii) In Examples, the segregation of the binder is suppressed since the amount of the solvent is low. In Table 1, the suppression of the segregation of the binder is seen by a migration index close to 1.0.

In the manufacturing conditions associated with Examples, the peel strength is increased and thus a reduction in the amount of the binder becomes possible.

When the manufacturing conditions Nos. 6 and 7 are compared to each other, it is seen that by reducing the amount of the mixed binder with respect to 100 parts by mass of the inorganic filler particles to 3.13 parts by mass, the cycle life is significantly increased. In addition, when the amount of the mixed binder is further reduced from 3.13 parts by mass, the cycle life is further enhanced. Therefore, the amount of the mixed binder with respect to 100 parts by mass of the inorganic filler particles is preferably 3.13 parts by mass or less. However, when the amount of the mixed binder is less than 0.25 parts by mass, superiority in peel strength is lost. From this point of view, it can be said that the amount of the mixed binder is preferably 0.25 parts by mass or more.

In the manufacturing conditions Nos. 7 and 8, even though the composition of the heat-resistant layer is the same, the cycle life is different. The difference can be explained by the distribution of the electrolytic liquid. That is, in this experiment, since the electrolytic liquid easily flows out from the negative electrode mixture layer, when the heat-resistant layer which has a large pore size and easily absorbs the electrolytic liquid is formed on the surface of the negative electrode mixture layer as in the manufacturing condition No. 8, the electrolytic liquid moves from the negative electrode mixture layer to the heat-resistant layer that is adjacent to the negative electrode mixture layer, resulting in an insufficient amount of the electrolytic liquid in the negative electrode mixture layer. On the other hand, in the manufacturing condition No. 7, since the heat-resistant layer is distant from the negative electrode mixture layer, it is thought that an appropriate distribution of the electrolytic liquid for the high-rate charge and discharge cycle is formed in the electrode group.

The disclosed embodiments and Examples are only examples in all aspects and are not limited. The scope of the invention is shown by the appended claims other than the above description and is intended to include equivalent meanings to the appended claims and all the changes without departing from the scope.

What is claimed is:

1. A manufacturing method for a non-aqueous electrolyte secondary battery comprising:
forming a mixture containing a binder, inorganic filler particles, and a solvent;
wet granulating the mixture by stirring and crushing the mixture to obtain granules containing composite particles and a solvent,
wherein the composite particles contain the inorganic filler particles and the binder, and the granules have a particle size of 10 μm to 200 μm;

pressing the granules in a state in which the solvent remains to form a green compact sheet; and disposing the green compact sheet on a surface of a positive electrode mixture layer or a negative electrode mixture layer, wherein a solid content concentration of the granules is equal to or higher than 70 mass % and lower than 100 mass %, and the particle size is a particle size at a cumulative value of 50% in a volume-based particle size distribution measured according to a laser diffraction/scattering method.

2. The manufacturing method according to claim 1, wherein, in the mixture, an amount of the binder is 0.20 parts by mass or more and 3.13 parts by mass or less with respect to 100 parts by mass of the inorganic filler particles.

3. The manufacturing method according to claim 1, wherein, in the mixture, an amount of the binder is 0.25 parts by mass or more and 3.13 parts by mass or less with respect to 100 parts by mass of the inorganic filler particles.

* * * * *